(12) United States Patent
Möller et al.

(10) Patent No.: US 6,411,934 B1
(45) Date of Patent: *Jun. 25, 2002

(54) OPERATING SYSTEM, PARTICULARLY FOR COMPONENTS IN A MOTOR VEHICLE USING SPEECH RECOGNITION

(75) Inventors: Carsten-Uwe Möller, Esslingen; Frank Reh, Stuttgart, both of (DE)

(73) Assignee: DaimlerChrysler AG, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/804,693

(22) Filed: Feb. 25, 1997

(30) Foreign Application Priority Data

Mar. 7, 1996 (DE) .................. 196 08 869

(51) Int. Cl.[7] ............................... G10L 21/00
(52) U.S. Cl. .................. 704/275; 704/270; 704/273; 345/161
(58) Field of Search ................ 704/270–277; 345/161

(56) References Cited

U.S. PATENT DOCUMENTS

| | | | | |
|---|---|---|---|---|
| 4,797,924 A | * | 1/1989 | Schnars et al. | 381/43 |
| 4,827,520 A | | 5/1989 | Zeinstra | |
| 4,897,630 A | * | 1/1990 | Nykerk | 704/275 |
| 5,223,776 A | * | 6/1993 | Radke et al. | 318/568.1 |
| 5,239,586 A | * | 8/1993 | Marui | 381/47 |
| 5,267,323 A | * | 11/1993 | Kimura | 704/275 |
| 5,287,109 A | * | 2/1994 | Hesse | 341/176 |
| 5,450,525 A | | 9/1995 | Russell et al. | |
| 5,644,627 A | * | 7/1997 | Segal et al. | 379/67 |
| 5,774,841 A | * | 6/1998 | Salazar et al. | 704/225 |
| 5,805,140 A | * | 9/1998 | Rosenberg et al. | 345/161 |
| 5,878,395 A | * | 3/1999 | Bennett | 704/275 |
| 5,950,166 A | * | 9/1999 | Hab-Umbach et al. | 704/275 |
| 6,009,355 A | * | 12/1999 | Obradovich et al. | 701/1 |
| 6,184,868 B1 | * | 2/2001 | Shahoian et al. | 345/161 |

FOREIGN PATENT DOCUMENTS

| | | |
|---|---|---|
| DE | 2744057 A1 | 4/1979 |
| DE | 3524439 C2 | 1/1987 |
| DE | 3605088 C2 | 11/1987 |
| DE | 3636678 A1 | 5/1988 |
| DE | 4205875 A1 | 9/1993 |
| EP | 0078016 B1 | 5/1983 |
| EP | 0686525 A1 | 12/1995 |
| GB | 2291165 A | 1/1996 |
| JP | A6045448 | 3/1985 |
| JP | (U) -62-81142 | 5/1987 |
| JP | A6274190 | 9/1994 |
| WO | WO96/21185 | 7/1996 |

OTHER PUBLICATIONS

Nishimotot et al "Improving human interface frawing tool using speech and key–board" Jul. 5, 1995, IEEE, 107–112.*

Search Report, Mar. 26, 1998, Europe.

Office Action, Jan. 28, 1998 Japan.

* cited by examiner

*Primary Examiner*—Vijay B Chawan
(74) *Attorney, Agent, or Firm*—Crowell & Moring LLP

(57) ABSTRACT

The invention describes an operating system which comprises a voice-operated device and an actuating device, various operating functions being assigned to the actuating device by means of the voice-operated device. According to the invention, the actuating device has several degrees of adjusting freedom and types of a haptic acknowledgment which can be set depending on the assigned operating function.

12 Claims, 1 Drawing Sheet

OPERATING SYSTEM, PARTICULARLY FOR COMPONENTS IN A MOTOR VEHICLE USING SPEECH RECOGNITION

BACKGROUND AND SUMMARY OF THE INVENTION

This invention relates to an operating system for components of a vehicle, including a voice operated device and a manually operable actuating device, with various operating functions assigned to the actuating device by way of the voice operated device.

This application claims the priority of German priority application number 196 08 869.0-26 filed on Mar. 7, 1996, the disclosure of which is expressly incorporated by reference herein.

An operating system of the above-mentioned type is known from European Patent Document EP 0 078 016 B1 which has a voice-operated device and an actuating device, the contents of which document are incorporated herein by reference thereto. In this case, various operating functions are assigned by way of the voice-operated device to the actuating device which is constructed as a push button.

It is considered to be a disadvantage in this case that the user receives no acknowledgment concerning the set value and the value range of the assigned operating function.

From German Patent Document DE 36 05 088 C2, the contents of which are incorporated herein by reference thereto, an operating system having an actuating device is known to which different operating functions can be assigned by means of a lift-over function and which is constructed as a rotating actuator. Depending on the assigned operating function, the actuating device provides the user with various programmable haptic acknowledgments.

From German Patent Document DE 42 05 875 A1, the contents of which are incorporated herein by reference thereto, an operating system, particularly a rotating actuator, is known in the case of which the type of a haptic acknowledgment is also freely changeable.

The indicated prior art has in common that only operating functions can be assigned to the actuating device which are set by similar degrees of adjusting freedom, particularly by rotating or pushing, but that mechanical actuating variables for operating mirrors, seats, etc. are not activated by analogous rotating actuators but by pure switching functions (forward/backward or left/right).

It is an object of the invention to improve an operating system of the above-mentioned type with respect to its ergonomic features.

According to the invention, this object is achieved by an operating system of the above referenced type, wherein the actuating device has several degrees of adjusting freedom which can be set depending on the assigned operating function.

According to the invention, this object is also achieved by an operating system of the above referenced type, wherein the actuating device has various types of a haptic sensitive to touch acknowledgment to the user which can be set as a function of the assigned operating function.

According to preferred embodiments of the invention, improved operating systems are achieved in that various operating functions are assigned to an actuating device by means of a voice-operated device, the actuating device having several degrees of adjusting freedom which can be set depending on the assigned operating function. In addition, a user can receive a haptic acknowledgment concerning the set value and the value range of the assigned operating function, in which case the type of haptic acknowledgment is also set by the assigned operating function. Furthermore, it is possible to set only the type of the haptic acknowledgment by means of the operating function assigned by way of the voice-operated device. As an additional possibility of an acknowledgment to the user, voice output devices and/or visual display devices are provided according to certain preferred embodiments of the invention.

When the various operating functions are carried out completely by a voice operation, it is found that not all analogous actuating functions can be operated advantageously by voice. One example is the audio system volume. Although the volume can very easily be set by the voice command "louder", "lower", "very loud" or "very low", problems will occur at least when larger volume ranges must be scanned. Although it is possible with known systems to repeat the above voice commands several times or to repeat the voice command "continue", such systems cannot be quite as comfortable as an analogous rotating actuator. However, the consequent use of rotating actuators for these purposes in known systems is no longer possible because of frequently overloaded front operating panels.

By means of a central operating device to which a respective desired operating function can be assigned by a voice command, in systems according to the present invention the user can proportion each desired actuating variable at any speed and sensitiveness and still only has to reach for a single button. After a brief adaptation phase in the case of an ergonomically sensible design according to the invention, it is virtually not necessary to change the viewing direction. The user can be optimally informed concerning the possibilities of the haptic and/or the acoustic and/or the visual acknowledgment by way of the selected settings.

For carrying out the assigned operating functions, the actuating device preferably has the following degrees of adjusting freedom: Translation along the x-axis (pushing forward or backward), along the y-axis (pushing to the right or the left) and along the z-axis (pressing down or pulling up); rotation about the x-axis (tilting to the left or right), about the y-axis (tilting to the front or to the back) and about the z-axis (rotating to the left or the right).

In addition, the actuating device can have the following types of haptic acknowledgment: Stop (limiting the movement in any position), for example, for relaying a maximal and/or minimal function value or a noticeable pressing and/or pulling point; different, freely selectible friction moments, for example, for relaying an average function value; simulation of a detent with variable detent forces, detent positions and detent widths, for example, for relaying a catching incremental position transducer; and returning the actuating device into a neutral position against the force of a user, for example, for relaying a joystick function.

All degrees of adjusting freedom and all types of haptic acknowledgment which are not relevant to the assigned operating function are blocked by corresponding devices so that the user can recognize from the set degrees of freedom and types of haptic acknowledgment alone which type of an operating function is momentarily present on the actuating device.

Other objects, advantages and novel features of the present invention will become apparent from the following detailed description of the invention when considered in conjunction with the accompanying drawings.

DETAILED DESCRIPTION OF THE DRAWINGS

Figure 1:
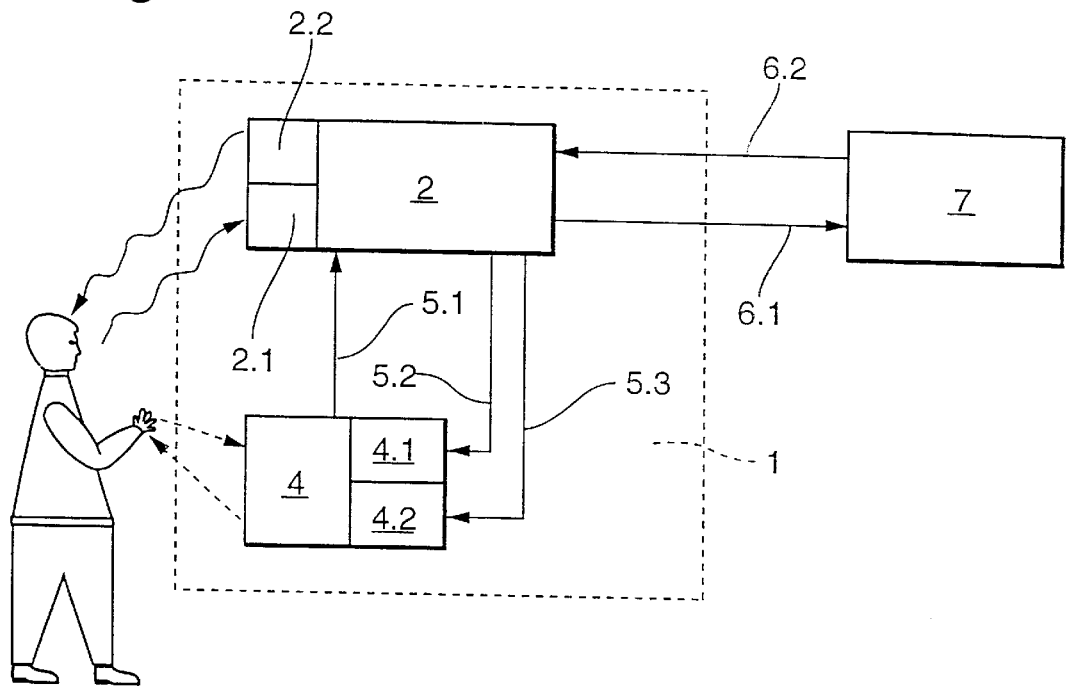
FIG. 1 is a schematic representation of preferred embodiments of an operating system according to the present invention.

FIG. 1 is a schematic representation of a first embodiment of the operating system. The illustrated operating system 1 comprises a voice-operated device 2 having a voice input device 2.1 and a voice output device 2.2, and an actuating device 4 which has devices for setting at least one degree of adjusting freedom 4.1 and devices for setting at least one type of a haptic acknowledgment 4.2. By pressing the actuating device 4 (translation in the z-direction), voice-operated device 2 is activated and the user can speak a predefined voice command which is converted into electric signals by the voice input device 2.1. The voice-operated device 2 interprets the electric signals corresponding to the user's voice command such that from then on and in a lasting manner, the actuating device 4 has an operating function which is assigned to the user's voice command. When the user presses the actuating device 4 again and speaks a different voice command, from this point in time, a different operating function is available to him at the actuating device 4. Corresponding to the selected operating function, the voice-operated device 2 sends, by way of the electric connections 5.2 and 5.3 control signals to the devices for setting the degrees of adjusting freedom 4.1 and the types of haptic acknowledgment 4.2. These devices 4.1 and 4.2 are preferably constructed as electromechanical and/or electromagnetic actuators by means of which it is possible to let forces act upon the actuating device 4. By means of the electric connection 5.1, the actuating device 4 supplies the generated actuating signals for the selected operating function by way of the voice-operated device 2 and by way of the electric connection 6.1 to the corresponding apparatus 7 to be operated. By way of the electric connection 6.2, the apparatus 7 to be operated supplies specific signals (for example, signals of sensors or limit switches) back to the voice-operated device 2. After the analysis of these signals, the voice-operated unit 2 supplies the corresponding control signals by way of the electric connections 5.2 and 5.3 to the actuating devices 4 in order to correspondingly change, as required, the setting of the degrees of adjusting freedom and/or the types of haptic acknowledgment. In this case, the electric connections 5.1 to 5.3 between the voice-operated device 2 and the actuating device 4 as well as the electric connections 6.1 and 6.2 between the voice-operated device 2 and the apparatuses 7 to be operated can be constructed as a data bus.

Figure 2:
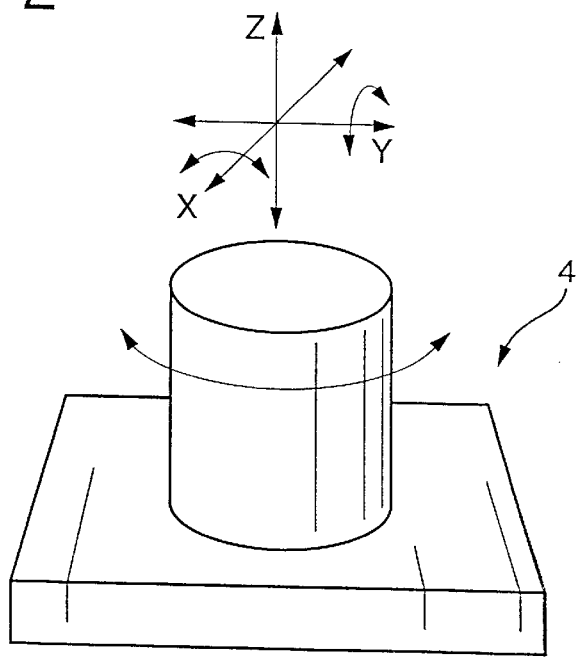
FIG. 2 is a schematic representation of a preferred embodiment of an actuating device for the operating system depicted in FIG. 1.

FIG. 2 is a schematic representation of an advantageous development of the actuating device 4. In this case, the operating functions which are described in the following and have the corresponding degrees of adjusting freedom and types of haptic acknowledgment can be assigned to the illustrated actuating device 4.

Relaying of the Maximal and Minimal Function Value

This operating function is represented by, for example, the volume, the bass, the pitches, the balance, the fan, etc. When the respective final value is reached, the actuating device will be blocked from being rotated farther into the corresponding direction.

Relaying of the Average Function Value and of Detents

Functions, such as balance, fader, bass, pitches and fan have a well-defined average value of which the user frequently wants to be informed without having to rely only on his visual and/or acoustic perception. When the average value is reached, the further rotation of the actuating device is made slightly more difficult which means that the average value can be felt. In the same manner, detents (increments) can also be made tangible. The number of detent points is a function of the operating function.

Indication of the Center and End Position by the Changed Introduction of Force

When adjusting mechanical components (seat, mirror, etc.), the user usually recognizes the reaching of the end position only visually (for example, the seat remains up). The user is therefore informed of the reached end position in that an increased restoring force occurs abruptly, or in that a vibration affects the actuating element. When the user releases the actuating element, it returns into its center position. Then the corresponding degree of adjusting freedom is blocked. The center position is often the starting point for a final adjustment and is still more difficult to recognize. The exceeding of the center position may be indicated by the triggering of a brief pulse.

All degrees of adjusting freedom and types of haptic acknowledgment which are not relevant to the assigned operating function can be blocked by electromagnetic and/or electromechanical devices. Thus the user can be informed of which degrees of adjusting freedom and types of haptic acknowledgment are set for the selected operating function (for example, mirror adjustment by way of rotating movements about the x- and y-axis, volume by way of the rotating movement about the z-axis).

Additional possibilities of an acknowledgment to the user are obtained if the operating system 4 is expanded by voice output devices 2.2, such as a loudspeaker, and/or by visual display devices, such as light-emitting diodes and/or a videoscreen. In addition to or instead of being informed by the haptic acknowledgment, the user can be informed by these devices concerning the selected operating functions and the corresponding set function values. The devices are particularly suitable for carrying out an interactive communication in a motor vehicle with respect to a list of names in the case of a telephone, the temperature setting of an air conditioner or a station finding in the case of a radio.

It is contemplated that, in addition to being used in a motor vehicle, the invention can also be used in other areas, for example, for controlling a machine tool or other complex devices which require that the user's attention be diverted as little as possible from the control tasks.

The illustrated actuating device 4 is shown as operable by the vehicle occupants' hand or hands. Embodiments are also contemplated where other members of the vehicle occupant such as feet or legs are used to operate the actuating device.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An operator system of a motor vehicle, comprising:
    an actuation device having a plurality of degrees of adjusting freedom, said activation device receiving a first mechanical operator input and providing a corresponding first output, said actuation device receiving a second mechanical input for determining one of a plurality of values within a predetermined range of said plurality of degrees of freedom and providing a corresponding second output; and
    a speech recognition device activated by said first output for receiving operator speech input in order to select one of a plurality of operating devices wherein the predetermined range of said plurality of degrees of adjusting freedom of said actuation device are set as a function of said selected operating device.

2. The operating system according to claim 1, wherein said actuation device is a manually operable actuating device.

3. The operating system according to claim 1, wherein said operating devices include a radio receiver, an air conditioning fan, and a vehicle part position adjusting device.

4. The operating system according to claim 3, wherein said vehicle part position adjusting device is a vehicle mirror adjusting device.

5. The operating system according to claim 3, wherein said vehicle part position adjusting device is a vehicle seat adjusting device.

6. The operating system according to claim 1, wherein said operating devices are devices of a motor vehicle.

7. The operating system according to claim 1, further comprising at least one visual display device which provide an operator with a visual acknowledgment dependent on the assigned operating device.

8. The system according to claim 1, further comprising a voice output device for providing an operator with an acoustic acknowledgment depending on the assigned operating device.

9. The operating system according to claim 1, wherein said plurality of degrees of adjusting freedom includes translation along each of an X, Y, and Z axis and rotation about the X, Y, Z axis.

10. An operator system, comprising:

an actuation device having a plurality of degrees of adjusting freedom, said actuation device receiving a first mechanical operator input and providing a corresponding first output, said actuation device receiving a second mechanical input for determining one of a plurality of values within a predetermined range of said plurality of degrees of freedom and providing a corresponding a second output; and a speech recognition device activated by said first output for receiving operator speech input in order to select one of a plurality of operating devices, wherein the actuation device provides a plurality of forms of haptic acknowledgment to the operator, which can be set as a function of the selected operating device.

11. The operating system according to claim 10, wherein said plural forms of haptic acknowledgment include actuating device end stops, and variable resistance ranges of movement of said actuating device.

12. An operating system for operating components in a motor vehicle, said operating system comprising:

a voice-activated operating device; and a manual actuating device, wherein the manual actuating device is assigned one of a plurality of operating functions as a result of output from said voice-activated operating device, and wherein said manual actuating device contains a plurality of degrees of adjusting freedom, including translation along a X-axis, translation along a Y-axis, translation along a Z-axis, rotation around the X-axis, rotation around the Y-axis and rotation around the Z-axis, wherein at least two of said plurality of degrees of adjusting freedom are blocked as a function of the assigned one of said plurality of operating functions to said actuating device by said voice-activated operating device.

* * * * *